United States Patent Office 2,723,021
Patented Nov. 8, 1955

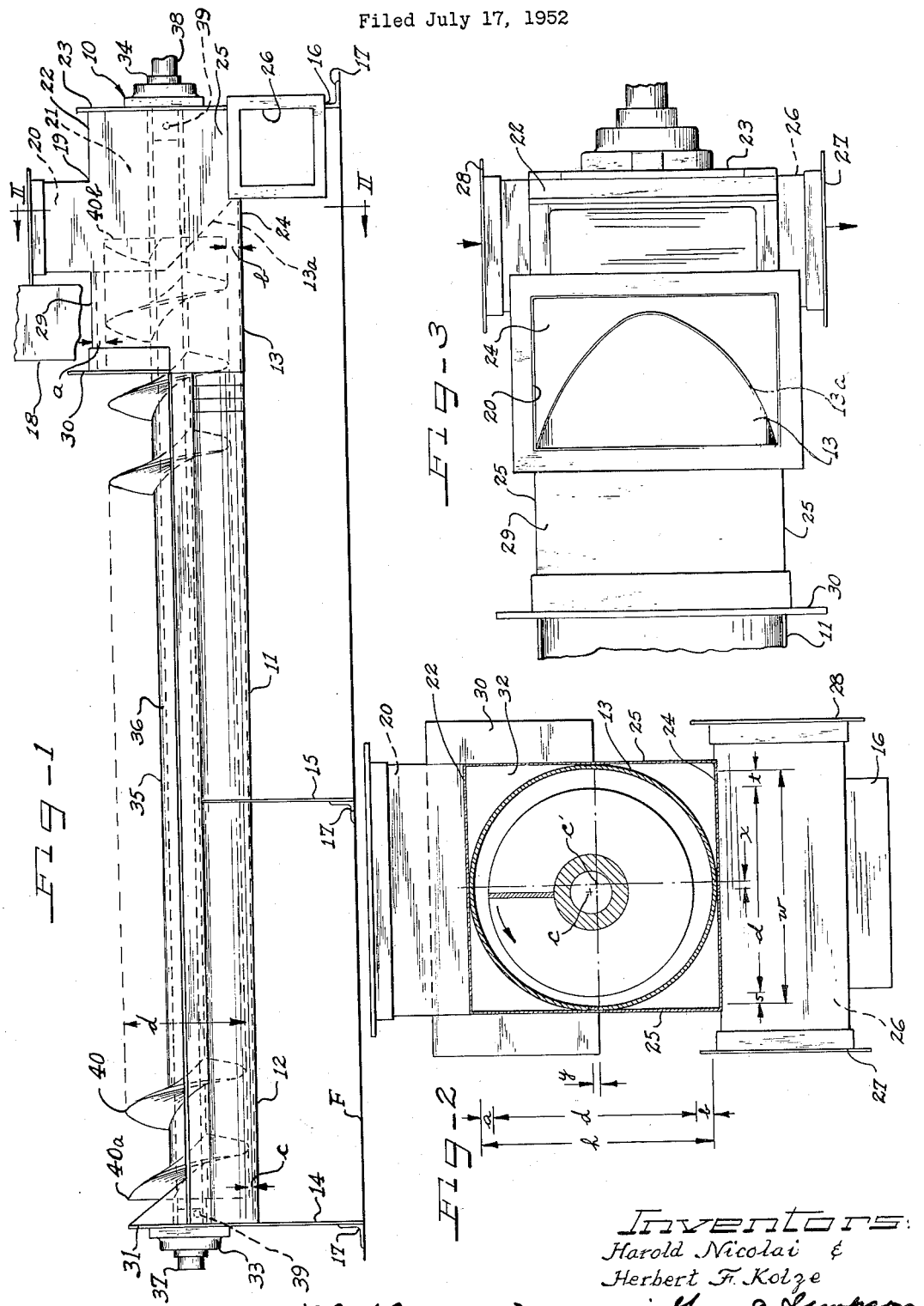

2,723,021

SCREW CONVEYOR OPERATION

Harold Nicolai, Chicago, and Herbert F. Kolze, Forest Park, Ill., assignors to Vastine Engineering Company, Inc., Forest Park, Ill., a corporation of Illinois Application July 17, 1952, Serial No. 299,398

13 Claims. (Cl. 198—213)

Our invention relates to improved screw conveyor operation, and more particularly, to an improved method of and apparatus for screw or worm conveyor operation employing sawdust-like compactible pulverulent material.

In recent times, the disposal of sawdust or the like particulate compactible waste materials has become a difficult and complicated problem in many industries. One of the methods of disposing of such materials involves picking the particulate materials up in a combustion-supporting gas stream, such as air, and conducting such air borne materials to a suitable furnace for burning the same. As will be appreciated, the particulate materials must be conveyed by suitable means and methods to a suction pick-up chamber for this purpose. Also, the conveyor means and method most preferably does not interfere with the over-all control of the air stream passing through the pick-up chamber. Our invention is particularly concerned with a screw conveyor operation whereby sawdust is conveyed from a suitable sawdust bin or the like source to the pick up chamber, without the necessity of introducing air into the pick-up chamber through the sawdust thus conveyed thereto.

We accomplish such screw conveyor operation by "choke feeding" of sawdust in the screw conveyor of our invention, using a restricted zone or tube through which the sawdust is conveyed by the rotating screw or worm, and wherein the sawdust is compacted so as to be rendered substantially air-impermeable. Generally, screw conveyors are operated under so-called "normal flow" conditions whereby the particulate material being moved by the conveyor fills the conveyor trough to approximately the level of the screw shaft, and an open-topped trough may be employed in such instances. In choke feeding, however, as carried out in the instant invention, the trough is provided at least at the discharge end portion thereof with a closed top so as to define a tubular or cylindrical end portion, and the sawdust is fed therethrough so as to completely fill such tubular or cylindrical portion.

Although the screw conveyor operation of our invention is uniquely adapted for use in conveying sawdust for the purposes just described, our invention is also applicable to screw conveyor operation involving the use of other materials. Preferably, such materials are resilient or compactable in nature and are substantially finely divided pulverulent material. For example, United States Patent No. 2,311,773, issued to Russell M. Patterson, on February 23, 1943, describes a screw conveyor operation for use with particulate compactible insulating material such as fibrous material of the character of mineral wool and the like, and our invention is adapted for use with materials of this particular character also.

One of the biggest difficulties arising in the handling of bulk materials such as the aforementioned insulating materials, and particularly waste materials such as sawdust, is the problem presented by the presence of particles if irregular size in such particulate material, and particularly particles of foreign materials, such as nails, stones and the like materials which are almost invariably present at least to a limited extent. Although the presence of such "irregularities" in the material afford certain complications, in the operation of open-topped screw conveyors (and the instant invention provides an improvement in this respect), it will be readily appreciated that the presence of these irregularities during choke feeding operation of a screw conveyor will invariably cause very great difficulty, and will usually cause damage to the conveyor itself and/or shearing of the suitable shear pins mounted in the conveyor shaft. In fact, we have found that on repeated occasions, during the choke feeding of sawdust in a normal screw conveyor adapted for that purpose, the shearing pins failed repeatedly, as soon as the presence of any extra large chips of wood, stones or nails appeared in the sawdust material being conveyed. Such failures took place to such an extent that in many instances screw conveyors could not be suitably used for these purposes.

Our invention consists in a unique improvement in screw conveyor operation, which overcomes such difficulties. In essence, our invention consists in the positioning and rotating of the screw or worm in certain positional relationships with respect to the conveyor trough and tubular discharge, and the construction of a conveyor shaft so that it will have a desired amount of flexibility to permit limited radial movement of the screw during operation.

It is, therefore, an important object of our invention to provide an improved screw conveyor operation, and more particularly, an improved method of and apparatus for screw conveyor operation involving the use of compactable particulate material such as sawdust or the like.

It is a further object of our invention to provide an improved screw conveyor comprising a generally cylindrical tube, a shaft rotatably mounted in said tube, and a continuous helical fin co-rotatably mounted on said shaft in said tube for cooperation therewith to push material through said tube, said tube being radially spaced from the fin periphery less distance on one side than on the other of the fin.

It is another object of our invention to provide an improved screw conveyor comprising a generally cylindrical tube, a shaft rotatably mounted in said tube, and a continuous helical fin co-rotatably mounted on said shaft in said tube for cooperation therewith to push material through said tube, the shaft longitudinal axis being radially spaced from the tube longitudinal axis a short distance to effect normally off-center rotation of the fins within the tube, and said shaft being yieldable to permit full radial movement of the fins within the tube during operation of the conveyor.

It is yet a further object of our invention to provide an improved screw conveyor for conveying compactable particulate material, comprising a generally hemi-cylindrical trough, a shaft rotatably mounted in said trough, and a continuous helical fin co-rotatably mounted on said shaft in said trough and radially spaced from said trough an average distance $r$ of 5–10% of the fin diameter, said fin being spaced a distance $r/3$—$3r/7$ from the trough at its down-coming side.

It is yet another object of our invention to provide an improved method of conducting sawdust-like compactable pulverulent material from a suitable source to a suction pickup zone, that comprises forcing a stream of the material through a restricted zone into the pick-up zone by rotating a worm in the stream in such restricted zone to compact the material therein to render it substantially air-impermeable, and providing restricting surfaces for defining such restricted zone surrounding said worm positioned one-half as close to the worm on one side as on the opposite side.

Still a further object of our invention is to provide an improved method of forcing sawdust-like compactable pulverulent material through a substantially horizontal tube filled with such material, that comprises positioning on the tube a substantially co-axial shaft mounting a continuous helical fin spaced from the tube walls an average distance $r$, and rotating the shaft so as to normally but yieldably urge the fin to a distance of $3r/7—r/3$ from the tube in the first down-coming quadrant of the fin rotation.

Other and further objects, features and advantages of our invention will become apparent to those skilled in the art from the following detailed description taken in connection with the accompanying drawings, which illustrate a preferred embodiment thereof.

On the drawings:

Figure 1 is a side elevational view of an improved screw conveyor embodying our invention;

Figure 2 is a sectional elevational view taken substantially along line II—II of Figure 1; and Figure 3 is a top plan view of the discharge end of the screw conveyor of Figure 1.

As shown on the drawings:

In Figure 1, the reference numeral 10 designates generally a screw conveyor embodying the instant invention. The screw conveyor 10 comprises a generally hemi-cylindrical trough 11 having an open topped inlet end 12 and a closed cylindrical or tubular discharge end portion 13. The trough 11 is suitably mounted on upright braces near the inlet end 12, at 14, near the middle at 15 and near the discharge end 13, at 16. Each of the braces 14, 15 and 16 is suitably rigidly mounted upon the floor F by means of angle irons 17, and the trough 11 is thus supported in substantially horizontal alignment.

The trough 11 is positioned so that the middle portion thereof and the inlet end 12 are within a sawdust bin or the like storage room for a source of compactable particulate material, the storage room wall 18 being shown partially in Figure 1. The discharge portion 13 of the trough 11 extends through an aperture in the bin wall 18 and merges with an enlarged pick-up chamber indicated generally by the reference numeral 19. The pick-up chamber 19 comprises a laterally extending top flanged air-inlet conduit 20, which leads downwardly into a substantially cubical pick-up chamber proper 21, defined by the top inlet conduit 20 and a partial top wall 22, an end wall 23, a floor 24 and vertically extending side walls 25, 25. The floor 24 is suitably apertured adjacent the end wall 23 to provide for an outlet into the discharge conduit 26, which extends the full width of the floor 24, providing for downward movement of air from the inlet conduit 20 and sawdust from the screw conveyor discharge 13 to flow downwardly through the aperture in the floor 24, into the discharge conduit 26 and laterally outwardly therefrom, as shown by the arrow at the outlet flange 27 at the lateral discharge of the discharge conduit 26. If desired, a by-pass line or other conduit (not shown) may be affixed to the flange 28 at the opposite end of the discharge conduit 26 so as to permit air or sawdust bearing air to flow in the direction indicated by the arrow at the flange 28 through the discharge conduit 26 and out into a suitable conduit (not shown) affixed to the flange 27 at the lateral discharge of the conduit 26. It will thus be appreciated that the air entering the pick-up chamber 21 is controlled by controlling the amount of air entering the top inlet conduit 20 and the amount of air entering the back side of the discharge conduit 26 at the flange 28. In order to obtain the necessary control of the total amount of air and sawdust passing out of the discharge chamber 26 at the flange 27, it is necessary to prevent uncontrolled amounts of air from passing through the cylindrical discharge portion of the trough 11, at 13.

A generally rectangular duct defined by a rear extension of the floor 24, rear extensions of the side walls 25, 25 and a top wall 29 extends surroundingly of the discharge portion 13 from the pick-up chamber 21 back through the apertured bin wall 18 and into the bin. A flange 30 terminates the rear extension of the top wall 29 and the top portions of the upstanding side walls 25, 25 so as to provide suitable fastening means for affixing the discharge end of the device to the bin wall 18. From the flange 30 rearwardly to the rear end wall 31, the trough 11 is a substantially hemi-cylindrical, open-topped conveyor trough. From the flange 30 forwardly, the conveyor trough 11 is in the form of the substantially cylindrical or tubular discharge portion 13, which extends forwardly a short distance so that the top of the tube 13 terminates flush with the rear edge of the air inlet conduit 20, and the bottom portion 13a (from substantially the level of the longitudinal axis of the tube 13 to the floor 24) is tapered forwardly in the form of a truncated right circular cylinder. Preferably, a suitably apertured back wall, as at 32, coplanar with the flange 30, extends from the floor 24, the side walls 25, 25 and the top 29 to surround the tube 13, but outside the periphery thereof, so as to effectively prevent the passage of air outside the tube 13 but within the rectangular housing duct therefor.

Aligned self-aligning seal-tight bearing assemblies 33 and 34 are suitably mounted respectively on the rear trough wall 31 and the front end wall 23 of the pick-up chamber 21, and the bearing assemblies 33 and 34 rotatably mount a shaft 35 extending the full distance therebetween. The shaft 35 comprises a hollow central portion 36, extending substantially the distance between the walls 31 and 23, and solid shaft nubs 37 and 38 mounted suitably in the bearing assemblies 33 and 34 respectively and extending therethrough and into the hollow central shaft member 36 at each end thereof. The shaft member 36 and the shaft nubs 37 and 38 are suitably attached for co-rotation by means of shear pins 39, 39, which are adapted to give under high torque loads to prevent damage to the conveyor, as will be fully understood by those skilled in the art.

A continuous helical fin 40 is co-rotatably affixed to the central shaft member 36, as by welding, and extends from its inlet end 40a, a short distance from the rear trough wall 31, to its discharge end 40b, which extends through the tube 13 and forwardly a short distance therefrom, so as to terminate substantially below the middle of the inlet air conduit 20. The axial length of the fin 40, which is the distance from the point 40a to the point 40b, in this specific embodiment of the invention is approximately 80 inches, and the fin diameter $d$ is approximately 10–12 inches. The length of the shaft member 36, which is substantially the distance from the end wall 31 to the front wall 23, is approximately 90–95 inches, and the shaft member 36 consists of extra heavy two inch I. D. steel pipe having a 2⅞ inch O. D. The hollow shaft mmeber 36 is thus sufficiently flexible or yieldable to permit a reasonable amount of radial movement of the fin 40 during operation of the conveyor. The degree of flexibility in the shaft member 36, at least to the extent of maximum flexibility, is essentially a matter of selection for those skilled in the art, depending upon the particular use involved, but the minimum degree of flexibility is that sufficient to permit radial movement of the fin 40 the full width of the trough 11, which is the dimension $w$ (Figure 2), as well as the full height $h$ (Figure 2) of the tubular discharge portion 13. In general, the shaft member 36 is sufficiently flexible if the central portion of the continuous fin 40 may come to rest upon the bottom of the trough 11 when the conveyor trough 11 is empty, although other criteria may be used to ascertain the desired extent of flexibility. As will be explained in detail hereinafter, the yieldability of the member 36 should be such that the clogging forces in the material generated by the attempted passage of lumps, enlarged particles, and foreign materials such as stones and nails, should be such that the member 36 tends to permit sufficient radial movement of the fin 40 to free such clogged materials, without damaging the fin 40, or the trough portions 11 and 13, and prior to the generation of such high torque forces that the shear pins 39 will give, as will also be explained. The trough 11 and discharge 13 are so positioned with respect to the fin 40 that the radial movement thereof may be used to serve the useful purpose of freeing or unclogging material in the conveyor.

One of the first features of the unique trough and fin arrangement here involved, is that of inclining the bottom of the trough portions 11, 12 and 13 slightly downwardly in the direction of flow of material in the trough. As will be appreciated, the instant embodiment calls for the positioning of the shaft 35 in substantially horizontal alignment and for the use of a fin 40 of substantially constant diameter $d$ the full axial length thereof. It will be seen that the inlet side 12 of the trough 11 is spaced downwardly from the fin bottom (or the bottom of the peripheral extremities of the fins) a very short distance $c$, which is about 5% $d$, or in this embodiment ½ inch. The bottom of the discharge tube 13 is spaced a slightly larger distance $b$ from the bottom of the fin 40 at the discharge end 40$b$. The distance $b$ being about ⅞ to $15/16$ inch in the instant embodiment, which is 8.5–9.5% $d$. It will thus be seen that the bottom of the trough 11 is inclined downwardly at an angle of about 20 minutes below the horizontal, and we have found that this very slight downward incline produces a very unusual effect in preventing the clogging of irregularities in the material being moved forward by the rotation of the fin 40.

Referring now to Figure 2, it will be seen that the shaft longitudinal axis, represented by the point C, is radially spaced from the tube longitudinal axis, represented by the point C′, a short distance so as to effect normally off-center rotation of the fins 40 within the tube 13. As will be seen, the fin 40 is spaced about ½ as much distance $s$ from the tube 13 on the left hand side (Figure 2) as the distance $t$ which the fin 40 is spaced from the tube 13 on the opposite or right hand side. The lateral spacing $x$ of the fin or shaft center C from the tube center C′ in this particular embodiment is ¼ inch, and the short side distance $s$ is ½-inch and the long side distance $t$ is one inch. Proportionately, the distance $x$ is 2.5% $d$ as shown, and it may be within the range of about 1–9% $d$, preferably about 2–5% $d$.

The over-all lateral dimension or width $w$, as here shown is 11½ inches, and the average space $r$ from the fin periphery of the tube wall may be expressed as $$\frac{w-d}{2}$$

or $$\frac{s+t}{2}=r=7.5\% \ d \ (d \text{ being 10 inches})$$

It will be appreciated that the average spacing $r$ must be such that a certain amount of radial movement of the fin 40 will be accommodated, as a result of forces generated by clogging of the material, and the selection of the average space $r$ will also depend to a certain extent upon the particle size, compactability of the material, and operating speeds and the like basic conditions. In general, we have found that, using the fin diameter $d$ as a basic dimension, that the distance $r$ may be about 5–10% $d$, and preferably about 7–9% $d$. On this basis also, the shorter distance $s$ may be about $$r/3—3r/7$$

and the longer distance $t$ may be about $$4r/7—2r/3$$

Radially off-setting the shaft laterally or vertically, or preferably both, produces a noticeable improvement. As here shown, the shaft axis C is radially offset or spaced from the tube axis C′ a distance $y$ upwardly, which distance $y$ is about 2% $d$. Most preferably $x$ or $y$ (or both) is 1–3% $d$. The average spacing $r$ between the fin periphery and the tube, may be represented as follows:

$$\frac{h-d}{2}=\frac{a+b}{2}=r=8.7\% \ d$$

which places $r$ in the upper portion of the range 7–9% $d$. Generally, it is not necessary to employ as large off-center spacing $y$ in the vertical direction as the off-center spacing $x$ in the lateral direction. In the embodiment here shown the shorter top distance $a$ may be $$r/3—3r/7$$

and is preferably about $3r/7$; whereas the larger bottom distance $b$ may be $$4r/7—2r/3$$

and is preferably about $4r/7$. It will be appreciated that the distances $s$ and $a$ may be substantially the same, or as here shown, they may be slightly different, the lateral distance $s$ being somewhat smaller. In like manner, the larger distances $t$ and $b$ may be substantially the same, or as here shown, the bottom distance $b$ may be slightly smaller. On this basis, $c$ is $r/3$.

It will be seen that the short lateral distance $s$ is on the down-coming side of the rotating fin 40, that is, the peripheral edge of the fin 40 is moving downwardly when it passes the short side, or short spacing $s$ and is moving upwardly when it passes the long side or long spacing $t$. The fin 40 is thus closest to the tube 13 in the first down-coming quadrant of the fin rotation.

It will be understood that modifications and variations may be effected without departing from the scope of the novel concepts of the present invention.

We claim as our invention:

1. A screw conveyor comprising a generally cylindrical tube, a shaft rotatably mounted in said tube, and a continuous helical fin co-rotatably mounted on said shaft and closely spaced from said tube for cooperation therewith to push material through said tube, said tube being radially spaced from the fin periphery less distance on one side than on the other of the fin and said tube being radially spaced from the fin periphery an average distance of 5–10% of the fin diameter around the entire periphery of the fin.

2. A screw conveyor comprising a generally cylindrical tube, a shaft rotatably mounted in said tube, and a continuous helical fin co-rotatably mounted on said shaft and closely spaced from said tube for cooperation therewith to push material through said tube, said tube being radially spaced from the fin periphery less distance on one side than on the other of the fin normally during rotation thereof and said shaft being sufficiently flexible to permit radial movement of said fin in said tube in response to clogging forces generated in the material in the tube and said tube being radially spaced from the fin periphery an average distance of 5–10% of the fin diameter around the entire periphery of the fin.

3. A screw conveyor comprising a generally cylindrical tube, a shaft rotatably mounted in said tube, and a continuous helical fin co-rotatably mounted on said shaft and closely spaced from said tube for cooperation therewith to push material through said tube, the shaft longitudinal axis being radially spaced from the tube longitudinal axis a short distance laterally to effect normally off-center rotation of the fins within the tube and said tube being radially spaced from the fin periphery an average distance of 5–10% of the fin diameter around the entire periphery of the fin.

4. A screw conveyor comprising a generally cylindrical tube, a shaft rotatably mounted in said tube, and a continuous helical fin co-rotatably mounted on said shaft and closely spaced from said tube for cooperation therewith to push material through said tube, the shaft longitudinal axis being radially spaced from the tube longitudinal axis a short distance vertically and laterally to effect normally off-center rotation of the fins within the tube and said tube being radially spaced from the fin periphery an average distance of 5–10% of the fin diameter around the entire periphery of the fin, and said shaft being yieldable to permit full radial movement of the fins within the tube during operation of the conveyor.

5. A screw conveyor comprising a generally cylindrical tube, a shaft rotatably mounted in said tube, and a continuous helical fin co-rotatably mounted on said shaft and closely spaced from said tube for cooperation therewith to push material through said tube, said tube being radially spaced from the fin periphery one-half as much distance on one side as on the opposite side of the fin and said tube being radially spaced from the fin periphery an average distance of 5–10% of the fin diameter around the entire periphery of the fin.

6. A screw conveyor comprising a generally cylindrical tube, a shaft rotatably mounted in said tube, and a continuous helical fin co-rotatably mounted on said shaft and closely spaced from said tube for cooperation therewith to push material through said tube, said shaft being substantially horizontally aligned and said tube being laterally off-center with respect to the shaft longitudinal axis and said tube being radially spaced from the fin periphery an average distance of 5–10% of the fin diameter around the entire periphery of the fin.

7. A screw conveyor comprising a generally cylindrical tube, a shaft rotatably mounted in said tube, and a continuous helical fin co-rotatably mounted on said shaft and closely spaced from said tube for cooperation therewith to push material through said tube and said tube being radially spaced from the fin periphery an average distance of 5–10% of the fin diameter around the entire periphery of the fin, said shaft being substantially horizontally aligned and said tube being laterally off-center with respect to the shaft longitudinal axis and the bottom of said tube being inclined slightly downwardly in the direction of the flow of the material therein.

8. A screw conveyor comprising a generally cylindrical tube, a shaft rotatably mounted in said tube, and a continuous helical fin co-rotatably mounted on said shaft and closely spaced from said tube for cooperation therewith to push material through said tube, the shaft longitudinal axis being laterally spaced from the tube longitudinal axis 1–3% of the fin diameter and said tube being radially spaced from the fin periphery an average distance of 5–10% of the fin diameter around the entire periphery of the fin.

9. A screw conveyor comprising a generally cylindrical tube, a shaft rotatably mounted in said tube, and a continuous helical fin co-rotatably mounted on said shaft and closely spaced from said tube for cooperation therewith to push material through said tube, the shaft longitudinal axis being spaced upwardly from the tube longitudinal axis 2% of the fin diameter and being spaced laterally from the tube longitudinal axis 2.5% of the fin diameter and said tube being radially spaced from the fin periphery an average distance of 5–10% of the fin diameter around the entire periphery of the fin.

10. A screw conveyor for conveying compactible particulate material, comprising a generally cylindrical tube, a shaft rotatably mounted in said tube, and a continuous helical fin co-rotatably mounted on said shaft in said tube and radially spaced from said tube an average distance $r$ of 5–10% of the fin diameter, said fin being spaced a distance $r/3$—$3r/7$ from the tube at its downcoming side.

11. A screw conveyor for conveying compactible particulate material, comprising a generally cylindrical tube, a shaft rotatably mounted in said tube, and a continuous helical fin co-rotatably mounted on said shaft in said tube and radially spaced from said tube an average distance $r$ of 5–10% of the fin diameter, said fin being spaced a distance $4r/7$—$2r/3$ from the tube at its bottom and its upcoming side.

12. A screw conveyor for conveying compactible particulate material, comprising a generally cylindrical tube, a shaft rotatably mounted in said tube, and a continuous helical fin co-rotatably mounted on said shaft in said tube and radially spaced from said tube an average distance $r$ of 5–10% of the fin diameter, said fin being spaced a distance $r/3$—$3r/7$ from the tube at its top and at its downcoming side.

13. A screw conveyor for conveying compactible particulate material, comprising a generally cylindrical tube, a shaft rotatably mounted in said tube, and a continuous helical fin co-rotatably mounted on said shaft in said tube and radially spaced from said tube an average distance $r$ of 5–10% of the fin diameter, said fin being spaced a distance $r/3$ from the tube at its downcoming side, and a distance $4r/7$ from the tube at its bottom.

References Cited in the file of this patent

UNITED STATES PATENTS

| | | |
|---|---|---|
| 1,845,873 | Hancock | Feb. 16, 1932 |
| 1,866,005 | Beaty | July 5, 1932 |
| 2,332,688 | Baily | Oct. 26, 1943 |
| 2,438,637 | Jansen | Mar. 30, 1948 |
| 2,532,318 | Mackey | Dec. 5, 1950 |
| 2,614,892 | Cherewick | Oct. 21, 1952 |
| 2,616,765 | Hill | Nov. 4, 1952 |

FOREIGN PATENTS

| | | |
|---|---|---|
| 371,394 | Germany | Mar. 15, 1923 |
| 523,765 | Germany | Feb. 2, 1930 |